US012612526B2

(12) United States Patent
Deighton et al.

(10) Patent No.: US 12,612,526 B2
(45) Date of Patent: Apr. 28, 2026

(54) THERMALLY RESISTANT AQUEOUS INKS

(71) Applicant: Sun Chemical Corporation,
Parsippany, NJ (US)

(72) Inventors: Rob Deighton, Rochdale (GB);
Christine Juckes, Rochdale (GB);
Callum Parkins, Rochdale (GB)

(73) Assignee: Sun Chemical Corporation,
Parsippany, NJ (US)

( * ) Notice: Subject to any disclaimer, the term of this
patent is extended or adjusted under 35
U.S.C. 154(b) by 0 days.

(21) Appl. No.: 18/691,018

(22) PCT Filed: Dec. 16, 2022

(86) PCT No.: PCT/GB2022/053276

§ 371 (c)(1),
(2) Date: Mar. 11, 2024

(87) PCT Pub. No.: WO2023/111593

PCT Pub. Date: Jun. 22, 2023

(65) Prior Publication Data

US 2024/0263029 A1      Aug. 8, 2024

Related U.S. Application Data

(60) Provisional application No. 63/290,886, filed on Dec.
17, 2021.

(51) Int. Cl.
| | |
|---|---|
| *C09D 11/104* | (2014.01) |
| *B41M 1/04* | (2006.01) |
| *B41M 1/36* | (2006.01) |
| *B41M 7/00* | (2006.01) |
| *B65B 61/02* | (2006.01) |
| *B65D 81/34* | (2006.01) |

(52) U.S. Cl.
CPC ............. *C09D 11/104* (2013.01); *B41M 1/04*
(2013.01); *B41M 1/36* (2013.01); *B41M 7/009*
(2013.01); *B65B 61/025* (2013.01); *B65D*
*81/343* (2013.01); *B65D 2203/00* (2013.01)

(58) Field of Classification Search
None
See application file for complete search history.

(56) References Cited

U.S. PATENT DOCUMENTS

| | | | | |
|---|---|---|---|---|
| 4,595,611 | A | 6/1986 | Quick | |
| 4,912,157 | A | 3/1990 | Clark | |
| 5,132,144 | A | 7/1992 | Parks | |
| 5,369,210 | A | 11/1994 | George | |
| 5,734,800 | A | 3/1998 | Herbert | |
| 5,786,410 | A * | 7/1998 | Foucher | C09D 11/32 |
| | | | | 523/161 |
| 6,046,253 | A | 4/2000 | Erdtmann | |
| 7,032,517 | B2 | 4/2006 | Bestmann | |
| 7,164,498 | B2 | 1/2007 | Van Bael | |
| 9,649,868 | B2 | 5/2017 | Simoni | |
| 2020/0047532 | A1 * | 2/2020 | Deighton | C09D 10/00 |
| 2020/0377762 | A1 * | 12/2020 | Deighton | C09D 11/102 |

FOREIGN PATENT DOCUMENTS

| | | |
|---|---|---|
| EP | 63108 A2 | 10/1982 |
| EP | 3124556 A1 | 2/2017 |
| JP | H06-32378 B2 | 4/1994 |
| JP | 2019-210455 A | 12/2019 |
| WO | WO 2021/007422 | 1/2021 |

OTHER PUBLICATIONS

International Search Report issued in International Application No.
PCT/GB2022/053276, mailed May 25, 2023.
Written Opinion of the International Searching Authority issued in
International Application No. PCT/GB2022/053276, mailed May
25, 2023.
International Preliminary Report on Patentability issued in International Application No. PCT/GB2022/053276, mailed Sep. 29, 2023.
Office Action issued in Japanese application No. 2024-533305
mailed Dec. 2, 2024, with English language translation thereof.

* cited by examiner

*Primary Examiner* — Joshua D Zimmerman
(74) *Attorney, Agent, or Firm* — Marian E. Fundytus;
Amster Rothstein & Ebenstein LLP

(57) ABSTRACT
The present invention relates to a method of providing a
packaged food product comprising printing a substrate with
an aqueous printing ink composition, drying said ink composition to provide a printed substrate and packaging a food
stuff with said printed substrate, wherein the method
excludes printing or applying any layers over the dried ink
composition, wherein the ink composition comprises water
and polyester resin. The present invention also relates to use
of an aqueous printing ink for printing on a substrate,
wherein the printed substrate has less than 50 ppb migratable
species when heated to temperatures in excess of 150° C.,
wherein the aqueous ink composition comprises water and
polyester resin.

15 Claims, No Drawings

THERMALLY RESISTANT AQUEOUS INKS

CROSS REFERENCE TO RELATED APPLICATIONS

The present application is a § 371 National Phase application based on PCT/GB2022/053276 filed Dec. 16, 2022, which claims the benefit of U.S. Provisional Application No. 63/290,886, filed Dec. 17, 2021 the subject matter of each of which is incorporated by reference in their entirety.

The present invention relates to a method of providing a printed article comprising applying an aqueous printing ink to a substrate, wherein the printed article is suitable for use in sensitive applications such as food packaging, and to printed articles obtained by said method. Advantageously, the method is suitable for providing heat-resistant printed articles, for example ovenable food packaging, and for printing images with extended color gamut.

4-color process printing, involving a combination of cyan, magenta, yellow and black inks (i.e., a 4-color CMYK set), can typically only cover about 55% of the Pantone Spot Color Range. Where print designs requiring colors outside the capability of the 4-color CMYK set are required, such as skin tones, this can be achieved by the use of specifically formulated spot colors matching the desired color. However, this approach can be restrictive for print designs requiring a number of colors outside the color gamut achievable with a 4-color CMYK set. To extend the color gamut of the process set then this can be achieved with additional colors in the process set such that a 5, 6, 7, or higher color process set ensues. A 7-color process set typically can cover 90%, or more, of the Pantone Spot color range.

U.S. Pat. No. 7,032,517 (Heidelberg) refers to how extended color gamut printing could be achieved through a CMYK ink set that could be augmented by at least one extra colorant, selected from red, blue and green pigments.

Multicolor process printing is now widely applied in inkjet printing where it is not feasible to use specific additional spot colors as this would require a dedicated printhead array. It is now common for 6-color and 7-color process sets to be used in inkjet printing. U.S. Pat. No. 5,734,800 (Pantone) refers to a 6-color printing process system. Similarly, Esko, (U.S. Pat. No. 7,164,498), refers to digital printing processes encompassing 6 (CMYKOG) and 7 (CMYKRGB) color process sets.

The current invention relates to a 7-color process set preferably including CMYK plus orange, red and violet inks. The invention also includes an optional white ink.

U.S. Pat. No. 9,649,868 (Sun Chemical) refers to a method of extending the color gamut of a 4-color process set with the addition of just one further process color. In particular, an extended color gamut was achieved with an ink set consisting of primary inks prepared with pigment blue 79, pigment red 122, pigment yellow 74, pigment black 7 and pigment orange 34. Flexographic printing is mentioned. There is no disclosure of how to achieve heat resistant prints suitable for low migration printing, especially of ovenable food packaging.

U.S. Pat. No. 4,595,611 (International Paper Company) relates to sulfopolyester dispersion containing inks that can be used in the printing of ovenable food containers. However, an overprint varnish and further plastic layer were applied to the prints. In addition, the ink according to U.S. Pat. No. 4,595,611 requires a cross-linking agent such a melamine/formaldehyde resin. Furthermore, a wide color gamut process ink set is not disclosed.

U.S. Pat. No. 4,912,157 (Eastman Kodak Company) refers to aqueous inks comprising sulfopolyester dispersions. However, the use of these dispersions in ovenable, low migration capable, wide color gamut printing ink sets was not discussed.

U.S. Pat. No. 5,369,210 (Eastman Kodak Company) refers to sulfopolyester dispersions with enhanced high temperature resistance properties. This was achieved through sulfopolyesters with glass transition temperatures in excess of 89° C. and heat resistance related to raised melt viscosities and improved print properties such as block resistance. Indeed, no mention is made of the use of these sulfopolyester dispersions in wide color gamut ovenable ink sets. Furthermore, the sulfopolyester dispersions preferably used in the present invention have glass transition temperatures significantly lower than required of U.S. Pat. No. 5,369,210. For example, Eastek 1200 (65° C.), Eastek 1100)(55° ° C., Eastek 1300 (36° C.), Eastek 1400 (29° C.), all ex. Eastman. Thus, a further aspect of the present invention is the use of sulfopolyester dispersions having glass transition temperatures of less than 80° C.

U.S. Pat. No. 6,046,253 (Eastman Kodak Company) refers to aqueous inkjet compositions comprising sulfopolyester dispersions.

An advantage of the present invention is that it provides an extended color gamut aqueous (preferably flexographic) printing ink set which enables the printing of low migration capable prints after the prints are exposed to temperatures in excess of 150° C. This is achieved without having to apply a heat resistant overprint varnish or further coatings (e.g. heat-sealing layers) over the printed ink.

Compared with the aforementioned references, the present invention provides a solution for aqueous (preferably flexographic) printing inks, especially of an extended color gamut multicolor process set, that reduce the risk associated with the evolution of low molecular weight compounds (e.g., compounds having molecular weights less than 1,000 Daltons) from prints at elevated temperatures, for example ≥150° C., that could cause undesirable contamination of foodstuffs contained in any package printed with inks of the invention. The invention is particularly suited to the printing of food packaging, including paper-based food packaging where the package and its contents may be reheated or cooked for periods of 5 minutes or more at temperatures in excess of 150° C., and temperatures in excess of 200° C. Inks and printed articles prepared according to the present invention evolve significantly less low molecular weight materials from the prints at elevated temperatures compared with inks using polyurethane dispersions or styrene-acrylic dispersions. Polyurethane dispersions and styrene-acrylic dispersions are the predominant resin binder chemistries currently used in state-of-the art aqueous flexographic printing inks and it is apparent from the inventors' findings that they are not suitable for use in ovenable inks for food packaging and the present invention resolves that issue.

Citation or identification of any document in this application is not an admission that such represents prior art to the present invention.

DETAILED DESCRIPTION

The present invention describes an aqueous printing ink set comprising cyan, magenta, yellow and black inks optionally with at least one additional further ink, for example selected from green, orange, violet and blue. Preferably, the invention describes an aqueous flexographic printing ink set comprising cyan, magenta, yellow and black inks optionally with at least one additional further ink, for example selected from green, orange, violet and blue. Preferably, the ink set further comprises white inks. Preferably, the present invention describes an aqueous flexographic printing ink set comprising cyan, magenta, yellow, black and white inks optionally with at least one additional further ink, for example selected from green, orange, violet and blue.

The inks according to the present invention comprise a polyester resin (for example a polyester dispersion or solution) as the main resin binder and the inks are preferably suitable for the printing of packaging and other articles requiring low migration when prints are thermally treated at elevated temperatures, for example ≥150° C. The multicolor process ink set of the invention preferably allows for ≥80%, and more preferably ≥90% of the colors covered by the Pantone Matching System to be printed.

In one aspect, the present invention provides a method of providing a packaged food product comprising printing a substrate with an aqueous printing ink composition, drying said ink composition to provide a printed substrate and packaging a food stuff with said printed substrate, wherein the method excludes printing or applying any layers over the dried ink composition, wherein the ink composition comprises water and polyester resin. Preferably, the substrate is paper or cartonboard.

The present invention also provides a packaged food product, preferably an ovenable packaged food product, wherein the packaged food product excludes any additional ink layers, varnish layers or plastic layers over the printed ink.

In another aspect, the present invention provides use of an aqueous printing ink for printing on a substrate, wherein the printed substrate has less than 50 ppb migratable species when heated to temperatures in excess of 150° C., wherein the aqueous ink composition comprises water and polyester resin.

The inventors have found that aqueous polyester dispersions or aqueous polyester solutions produce inks with superior thermal resistance compared with styrene-acrylic, acrylic and polyurethane dispersions or solutions that are usually used in the preparation of aqueous flexo (i.e. flexographic) printing inks. Accordingly, the aqueous printing inks of the present invention are suitable for the printing of ovenable food packaging; that is food packaging where the food contained in the package may be reheated or cooked in an oven at temperatures up to 250, and even 300° C. The inventors have found that the correct selection of pigments along with the use of a polyester resin produces inks which do not generate high levels (e.g., ≥100 ppb) of low molecular weight compounds (e.g., compounds having molecular weights less than 1,000 Daltons) when prints made with the inks are heated to temperatures which could cause unwanted, and potentially hazardous, contamination of the packaged foodstuff as a result of the migration of low molecular weight compounds from the ink into the food. Advantageously, this is achieved without applying heat resistant overprint varnishes or sealing plastic layers over the ink.

The inks used in the present invention may comprise an aqueous sulfopolyester dispersion as the polyester resin. The inventors have found that inks comprising sulfopolyester dispersions have superior heat resistance compared with inks comprising either polyurethane dispersions or styrene-acrylic dispersions. Accordingly, the printing ink used in the present invention is suitable for the printing of food packaging that will be heated to temperatures of more than 150° C., without evolving high levels (e.g., ≥100 ppb) of undesirable low molecular weight components (e.g., compounds having molecular weights less than 1,000 Dalton) that could migrate from the prints and contaminate the food contained within the package. Advantageously, this is achieved without applying heat resistant overprint varnishes or sealing plastic layers over the ink. Thus, without a specific need for heat resistant overprint varnishes, or sealing plastic layers surrounding the print, the invention enables printed food packaging to be prepared that can resist the temperatures experienced in the reheating or cooking of food while reducing the risk of contaminating the food with undesirable low molecular weight compounds that may migrate from the print.

A further advantage of the present invention is that through the selection of 5, 6, 7-color process printing ink sets an extended color gamut is achievable, with the potential to be able to print designs covering 70% or more, of the Pantone Spot color range.

The present invention also provides a method of providing a printed article comprising applying one or more of the ink compositions disclosed herein onto a substrate and drying the substrate wherein the inks are not overprinted with an overprint varnish. Furthermore, the method of the present invention does not require any further plastic layers to be applied over the printed ink. The invention also provides a printed article resulting from the method of the invention. Preferably, the printed article is a food packaging article. The absence of any overprint varnish or further plastic layers over the inks reduces the number of layers required in the food packaging, which increases the sustainability and recyclability of the food packaging.

The invention enables the printing of ovenable food packaging with aqueous printing inks (preferably aqueous flexographic printing inks) with a reduced risk of causing unwanted contamination of the food packaging. This is especially important where the inks are used in the printing of cartonboard food packaging where there may be no significant plastic barrier layer between the print and the packaged food. This enables the printing of food packaging derived from renewable (e.g., paper) resources. Thus, the printing ink of the invention is suitable for printing of paper-based food packaging. Examples of other potential end uses include packaging, electronics and automotive components where high temperatures are commonly experienced.

The invention discloses an aqueous flexographic ink set, with the capability of printing images with extended color gamut on food packaging, or other sensitive articles, with good thermal resistance. The good thermal resistance of the inks is achieved through a combination of using a water-based polyester resin solution or dispersion along with selecting pigments for 5, 6, 7 or higher process color printing sets that do not evolve significant amounts of low molecular weight compounds at temperatures in excess of 150° C. Thus, water-based flexo ink sets comprising cyan, magenta, yellow and black pigments, along with any of orange, green, violet, blue and red pigments are disclosed that are suitable for the printing of packaging (preferably food packaging) that reduce the risk associated with the migration of potentially hazardous compounds with molecular weights less than 1,000 after the print has been exposed to temperatures in excess of 150° C. This is a well-recognized risk in the food packaging, printing and converting industries and is bound by a number of state regulations, for example the EU regulation (EC) No 1935/2004. The European Printing Ink Association ('EUPIA') sets out guidance pertaining to printing inks and the restrictions on printing inks used to print food packaging. In particular, the EUPIA food packaging guidelines recommend that Article 3 of EU regulation (EC) No 1935/2004 is followed when producing printed matter for food packaging. Article 3 of EU regulation (EC) No 1935/2004 stipulates that food contact materials must be manufactured according to Good Manufacturing Practice (GMP). The inks of the present invention meet those requirements.

The printing ink compositions according to the present invention are suitable for food contact applications, for instance food packaging or other articles intended to come into contact with food. The printing ink compositions according to the present invention are suitable for use on the outside of food packaging (i.e., the surface that is not in contact with food) or on the inside of food packaging (i.e., the surface that is in contact with food).

As well as being safe for food contact, the inks of the present invention can form an ink set, with the capability of printing images with extended color gamut. Thus, the present invention enables images to be printed on food packaging with an extended color gamut.

An aspect of the invention is the use of sulfopolyester dispersions in the preparation of the inks. The inventors have found that inks comprising sulfopolyester dispersions produce significantly less low molecular weight components (e.g., compounds having a molecular weight of less than 1000 Daltons), compared with conventional inks comprising either polyurethane or styrene-acrylic dispersions, when prints of the inks are heated to temperatures in excess of 150° C. Indeed, when prints of inks prepared according to the invention were treated at 220° C. for 2 hours they were able to produce levels of low molecular weight migratable species that could cause contamination equivalent to less than 50 ppb in a simulated foodstuff. In comparison, aqueous flexographic printing inks comprising a styrene-acrylic dispersion produced levels of low molecular weight migratable species well in excess of the equivalent of 100 ppb contamination in a simulated foodstuff.

Where sulfopolyester dispersions are used these are preferably aqueous sulfopolyester dispersions having a solids content of from about 10% to about 40%, more preferably from about 15% to 35%.

As used herein the term "sulfopolyester" refers to a polyester that contains residue of a sulfomonomer. Sulfopolyesters are typically prepared using sulfonated dicarboxylic acid(s) as at least one of the monomers within the polyester. For example, sulfopolyester dispersions can be prepared by the reaction of sodiosulfoisophthallic acid with any blend of diols. The resulting polymer can then be dispersed in water, on account of the hydrophilic sodiosulfo groups appended along the polymer chain. Preferably, the sulfopolyester can be dispersed in water without using surfactants or amines. Thus, the aqueous sulfopolyester dispersions used in the present invention are preferably surfactant and amine free.

The sulfopolyester dispersions suitable for use in the present invention may optionally include one or more water-soluble organic solvents. Suitable water-soluble organic solvents include, but are not limited to, alcohols (e.g., methanol, ethanol, propanol, isopropyl alcohol, butanol, polyols, ethylene glycol, propylene glycol, dipropylene glycol, glycerine, and PEG, among others), ketones and ketone alcohols (e.g., acetone and diacetone alcohol, among others), ethers (e.g., tetrahydrofuran, dioxane, and alkylethers, among others) and ethers of polyhydric alcohols (e.g., ethylene glycol monomethyl ether, ethylene glycol monoethyl ether, ethylene glycol monoethyl ether acetate, di(ethyleneglycol) monomethyl ether). Where used, the optional water-soluble organic solvent is preferably an alcohol selected from methanol, ethanol, n-propanol, isopropyl alcohol, butanol, more preferably n-propanol. Where used, the optional water-soluble organic solvent is preferably present in no more than 10% of the aqueous dispersion, preferably no more than 5% of the aqueous dispersion.

Alternatively, the sulfopolyester dispersions suitable for use in the present invention are co-solvent free, i.e., the sulfopolyester dispersions comprise no more than 1% of a co-solvent such as a water-soluble organic co-solvent.

Preferably, the polyester resin used in the present invention has a glass transition temperature of ≤80° C., more preferably ≤60° C. Preferably, the polyester resin used in the present invention is a sulfopolyester a glass transition temperature of ≤80° C., more preferably ≤60° C.

Various types of aqueous polyester solution and dispersion resins are suitable for preparing the aqueous inks of the invention, for example sulfopolyester dispersions such as Eastek 1100 (Tg of 55° C.), Eastek 1200 (Tg of 65° C.), Eastek 1300 (Tg of 36° C.) and Eastek 1400 (Tg of 29° C.) from Eastman may be used.

Preferably, the polyester resin may be a rosin-derived polyester. For example, rosin esters, such as the Hydrorez range from Lawter and the Erkamer range from Robert Kraemer are also suitable for the preparation of aqueous inks according to the invention.

In the case of inks prepared using rosin-derived polyesters, the inks have an enhanced sustainable profile due to rosin, otherwise known as colophony, being a raw material derived from natural sources (principally pine trees) and is converted into polyesters, for example, by reaction with maleic anhydride followed by subsequent reactions including reaction with polyols, which themselves may be naturally derived. Thus, the invention has further capacity to enhance the sustainability of aqueous printing inks for the printing of articles requiring heat resistant prints that do not evolve significant amounts of low molecular weight compounds during exposure to high temperatures, of 150° C. and greater.

Preferably, the polyester resin has an acid value of ≥50 mgKOH/g, preferably ≥100 mgKOH/g. Preferably, the polyester resin has an acid value of ≤250 mgKOH/g, more preferably ≤200 mgKOH/g. Preferably, the polyester resin has an acid value of from about 50 to about 250 mgKOH/g, more preferably from about 100 to about 200 mgKOH/g.

Preferably, the polyester resin has a hydroxyl value of ≥50 mgKOH/g, preferably ≥100 mgKOH/g. Preferably, the polyester resin has a hydroxyl value of ≤250 mgKOH/g, more preferably ≤200 mgKOH/g. Preferably, the polyester resin has a hydroxyl value of from about 50 to about 250 mgKOH/g, more preferably from about 100 to about 200 mgKOH/g.

Preferably, the polyester resin has a softening point of from about 80 to about 180° C., more preferably from about 110 to about 150° C.

Preferably, the polyester resin has a viscosity of 20-30 seconds in Ford cup 4 at 22° C. when measured as a 50% by weight solution in ethanol.

As will be understood in the art, polyester resins are prepared from a carboxylic acid or carboxylic acid derivative and a diol. Preferably, the polyester resins suitable for use in the present invention are not prepared from sulfomonomers (i.e., the polyester does not contain any residues of a sulfomonomer). In the most preferred aspects of the invention, the polyester resin is not prepared from isophthalic acid or sulfosuccinate esters and is therefore isophthalate and sulfosuccinate free.

Preferably, the ink compositions used in the present invention comprise at least 12 wt % polyester resin, more preferably at least 20 wt % polyester resin, even more preferably at least 30 wt % polyester resin. Preferably, the ink compositions used in the present invention comprise no more than 50 wt % polyester resin. Preferably, the ink compositions used in the present invention comprise from about 12 to about 50 wt % polyester resin, preferably from about 20 to about 50 wt % polyester resin, more preferably from about 30 to about 50 wt % polyester resin.

Preferably, the ink compositions used in the present invention comprise one or more neutralizing agents. Suitable neutralizing agents include ammonia and amines having a boiling point of less than 100° C. such as triethylamine and dimethyl amine. In the most preferred aspects of the invention the ink compositions comprise ammonia. Preferably, the ammonia is in the form of an aqueous solution.

Where used, the neutralizing agent is present in an amount from about 0.1 wt. % to about 5 wt. % of the ink composition, preferably from about 0.5 wt % to 3 wt % of the ink composition. Where used, the neutralizing agent is preferably ammonia and the ammonia is preferably present in an amount from about 0.1 wt. % to about 5 wt. % of the ink composition, preferably from about 0.5 wt % to 3 wt % of the ink composition.

In addition to the aforementioned polyester resins, the ink compositions of the present invention may optionally also comprise one or more additional resin types, as long as a printed and dried article containing the ink compositions is compliant with EUPIA food contact guidelines, especially at elevated temperatures (for example ≥150° C.). Examples of such resins include but are not limited to polyamides ketones, aldehydes, alkyds, phenol-formaldehydes, rosin resins, hydrocarbons, phenolics, nitrocellulose, vinyls, rosin esters and epoxies.

The invention is most advantageously directed towards flexographic and inkjet printing inks, with flexographic printing being most preferred. Although the invention is preferably directed towards aqueous flexographic printing inks, it also encompasses inks (preferably pigmented inks) that can be applied by any other method including; inkjet printing, rotogravure printing, offset printing and screen printing.

Preferably, the inks of the invention have a viscosity of 18 to 35 seconds (Zahn 2 cup) as measured using deionized water at 23° C.

The printing inks of the invention may optionally comprise any water-soluble organic co-solvent. Although volatile solvents such as ethanol, propanol and isopropanol may be used, where the inks are intended for inkjet printing it is preferred that those which are not highly flammable or volatile should be used, typically a polyol, an alkylene glycol, an alkylene glycol ether or ether acetate type, with the following non-limiting examples: 4-hydroxy-4-methyl-2-pentanone, diethyelene glycol, diethylene glycol butyl ether, diethylene glycol ethyl ether, diethylene glycol methyl ether, diethylene glycol monoethyl ether acetate, diethylene glycol monopropyl ether, dipropylene glycol, dipropylene glycol ethyl ether, dipropylene glycol methyl ether, ethylene glycol butyl ether, ethylene glycol ethyl ether, ethylene glycol isopropyl ether, ethylene glycol methyl ether, ethylene glycol propyl ether, glycerine carbonate, N-methyl 2-pyrrolidone, glycerol, propylene glycol, propylene glycol ethyl ether, propylene glycol ethyl ether acetate, propylene glycol methyl ether, propylene glycol n-propyl ether, triethylene glycol, triethylene glycol butyl ether, triethylene glycol methyl ether, tripropylene glycol, tripropylene glycol methyl ether, N-methyl pyrollidone, urea, and the like. It is preferred that where such co-solvents are used, they should form less than 35% (w/w), and more preferably less than 30.0% (w/w) and even more preferably 25% (w/w), or less of the ink composition. Furthermore, it is preferred that the concentration of solvents having boiling points of greater than 250° C. should be less than 10.0% (w/w) and more preferably less than 5.0% (w/w) of the ink composition.

Preferably, the ink composition used in the present invention do not comprise a crosslinking agent. Preferably, the ink compositions do not comprise melamine-formaldehyde resins, zinc oxide, carbodiimide, cupric oxide, magnesium oxide, calcium oxide, glutaraldehyde, glyoxal, borates, potassium persulfate, aluminium chloride, titanium tetrahydrochloride, zinc chloride or any combination thereof. Most preferably, the ink compositions used in the present invention do not comprise melamine-formaldehyde resins, zinc oxide or a combination thereof.

Preferably, the ink compositions used in the present invention do not comprise a self-crosslinking acrylic resin. As will be understood in the art, self-crosslinking acrylic resins contain functionality which is self-reactive and thus do not require a separate co-reactant per sc. A self-crosslinking polymer is usually in the form of an aqueous dispersion or emulsion and is typically the product of at least two monomers that react with one another. For example, such a polymer may contain both a carbonyl and an amine functional group. There are several mechanisms by which a polymer can be self-crosslinking. One mechanism is by the use of phase separated polymers, such as core-shell polymers. The shell polymer is hydrophilic, while the core polymer is hydrophobic. The hydrophilic shell maintains the dispersion, while the hydrophobic core provides the reactive sites for crosslinking. Alternatively or in addition, self-crosslinking polymer emulsions can comprise crosslinkable functional groups attached to the polymer backbone in addition to a crosslinker (i.e. a polyfunctional species that reacts with said crosslinkable functional groups). Typically, in self-crosslinking acrylic polymer chemistry, polymers containing ketone groups crosslink at room temperature when combined with bi- or polyfunctional compounds that are reactive towards carbonyl.

Preferably, the ink compositions used in the present invention do not comprise a self-crosslinking acrylic polymer formed from methyl acrylic acid (MAA), methyl methacrylate (MMA), butyl acrylate, butyl methacrylate, styrene, and methyl styrene. Most preferably, the ink compositions used in the present invention do not comprise a self-crosslinking polymer that is a styrene/acrylic ester copolymer.

The inks used in the present invention are water-based. Unless stated otherwise, water-based inks comprise ≥20%, ≥25%, or ≥30% by weight. Preferably, the amount of water is ≤95%, ≤85%, ≤80%, ≤75%, ≤70%, ≤65%, or ≤60% by weight. Accordingly, the amount of water in the composition is 20 to 95% by weight, such as 20 to 80, and 20 to 70% by weight. Preferably, the range of water in the composition is typically 30 to 75% by weight, and more preferably 30 to 60% by weight.

Since the products of the current invention are primarily water-based in nature, it is also preferable to optionally include a biocide or anti-mold agent. Suitable examples include products based on, but not limited to, the following biocide structural types: benz-isothiazolinone, bromo-nitro-propane-diol, isothiazolinone, ethylenedioxydimethanol, or iodo-propynyl butyl carbamate. Some commercially available grades include those marketed under the trade names Intercide (Akcros Chemicals) or Nipacide (Clariant). Other types of biocide that could be considered include sodium dehydroacetate (Geogard 111S from Lonza), sodium benzoate (Vancide 51 from R. T. VANDERBILT), sodium pyridinethiol-1-oxide (Sodium Omadine from Arch Chemicals), sodium salt of o-phenylphenol (Dowicide A from DOW Chemical) and ethyl p-hydroxybenzoate (Nipastat Sodium from Aako). These are preferably used at an amount of 0.01 to 1.00% by mass in the ink composition.

Defoamers can also optionally be included in the formulation; these prevent the formation of foam during manufacture of the ink and also while jetting. Defoamers are particularly important with recirculating printheads. Examples of suitable defoamers include, but are not limited to, TEGO FOAMEX N, FOAMEX 1488, 1495, 3062, 7447, 800, 8030, 805, 8050, 810, 815N, 822, 825, 830, 831, 835, 840, 842, 843, 845, 855, 860, and 883, TEGO FOAMEX K3, TEGO FOAMEX K7/K8 and TEGO TWIN 4000 available from Evonik. Available from BYK are BYK-066N, 088, 055, 057, 1790, 020, BYK-A 530, 067A, and BYK 354. The additives DC62, DC65, DC 68, DC71 and DC74 are available from Dow Corning. Agitan 120, 150, 160, 271, 290, 298, 299, 350, 351, 731, 760, 761, and 777 are available from Munzing. Surfynol 104PA, AD01, DF-110, DF-58, DF-62, DF-66, DF-695, DF-70, and MD-20 are available from Air Products.

Surface control additives are often optionally used to control the surface tension of the ink, which is required to adjust the wetting on the face plate of the printhead, and also to give the desired drop spread on the substrate, or, in the case of multi pass inkjet printing, wet on dry drop spread. They can also be used to control the level of slip and scratch resistance of the coating. Examples of suitable surface control additives include but are not limited to TEGO FLOW 300, 370, and 425, TEGO GLIDE 100, 110, 130, 406, 410, 411, 415, 420, 432, 435, 440, 482, A115, and B1484, TEGO GLIDE ZG 400, TEGO RAD 2010, 2011, 2100, 2200N, 2250, 2300, 2500, 2600, 2650, and 2700, TEGO TWIN 4000 and 4100, TEGO WET 240, 250, 260, 265, 270, 280, 500, 505, and 510 and TEGO WET KL245, all available from Evonik. Available from BYK are BYK 333 and 337, BYK UV 3500, BYK 378, 347 and 361, BYK UV 3530 and 3570, CERAFLOUR 998 and 996, NANOBYK 3601, 3610, and 3650, and CERMAT 258. Available from Cytec are EBECRYL 350 and 1360, MODAFLOW 9200, and EBECRYL 341. From Sartomer the aliphatic silicone acrylate CN9800 may be used. Surfynol 104, 420, 440, 465, 485, 61, 82, and 2502 are available from Air Products. Multiwet BD, EF, SU, SO, and VE are available from Croda. Capstone FS-30, 31, 34, 35, 50, 51, 60, 61, 63, 64, 65, and 3100 are available from Du Pont.

Included in the ink formulation can optionally be a suitable de-aerator. These prevent the formation of air inclusions and pinholes in the cured coating. These also reduce rectified diffusion, which can cause reliability issues in the printhead. Non-limiting examples include the following products available from Evonik: TEGO AIREX 900, 910, 916, 920, 931, 936, 940, 944, 945, 950, 962, 980, and 986.

The printing inks of the present invention typically contain one or more colorants. Colorants can contribute to the overall migration of a printed construct. Thus, it is important to select colorants that do not exhibit excessive migration, making them suitable for providing printed constructs that meet EUPIA regulations for direct food content, especially at elevated temperatures. The method for selecting the appropriate low-migration colorants for food contact applications is described in detail in WO 2021007422, which is incorporated herein in its entirety for reference.

Examples of such low migration colorants include Paliotol Yellow D1818, Paliotol Yellow D0960, Irgazin Orange D2905, Irgazin Rubine L4025, Heliogen Blue D6840, Cromophtal Violet D5700, Fastogen Super Magenta RY, XPB-509, Suncroma C47-2222, Isoindoline yellow, diketopyrrolo-pyrolle orange, diketopyrrolo-pyrolle red, quinacridone red, phthalocyanine blue, dioxazin violet, carbon black, titanium dioxide, and blends thereof.

The ink compositions of the present invention may optionally additionally contain one or more other colorants that may exhibit higher migration than those listed in the previous paragraph. Preferably, these higher migration colorants would be used in sufficiently small quantities such that the final print construct is still within EUPIA food migration regulations. As will be understood, it is the final print construct that must pass EUPIA regulations, not the individual materials themselves. A list of such additional colorants includes pigments and/or dyes. Examples of suitable organic or inorganic pigments include carbon black, zinc oxide, titanium dioxide, phthalocyanine, anthraquinones, perylenes, carbazoles, monoazo and disazobenzimidazoles, rhodamines, indigoids, quinacridones, diazopyranthrones, dinitroanilines, pyrazoles, diazopyranthrones, pyrazoles, dianisidines, pyranthrones, tetracholoroisoindolines, dioxazines, monoazoacrylides and anthrapyrimidines. The dyes include but are not limited to azo dyes, anthraquinone dyes, xanthene dyes, azine dyes, combinations thereof and the like.

Commercial organic pigments classified according to Color Index International may be used, including, but not limited to, those according to the following trade designations: blue pigments PB1, PB15, PB15:1, PB15:2, PB15:3, PB15:4, PB15:6, PB16, PB60; brown pigments PB5, PB23, and PB265; green pigments PG1, PG7, PG10 and PG36; yellow pigments PY3, PY14, PY16, PY17, PY24, PY65, PY73, PY74 PY83, PY95, PY97, PY108, PY109, PY110, PY113, PY128, PY129, PY138, PY139, PY150, PY151, PY154, PY156, PY175, PY180 and PY213; orange pigments PO5, PO15, PO16, PO31, PO34, PO36, PO43, PO48, PO51, PO60, PO61 and PO71; red pigments PR4, PR5, PR7, PR9, PR22, PR23, PR48, PR48:2, PR49, PR112, PR122, PR123, PR149, PR166, PR168, PR170, PR177, PR179, PR190, PR202, PR206, PR207, PR224, PR254 and PR 264: violet pigments PV19, PV23, PV32, PV37 and PV42; black pigments PBk1, PBk6, PBk7, PBk8, PBk9, PBk10, PBk11, PBk12, PBk13, PBk14, PBk17, PBk18, PBk19, PBk22, PBk23, PBk24, PBk25, PBk26, PBk27, PBk28, PBk29, PBk30, PBk31, PBk32, PBk33, PBk34, PBk35, NBk1, NBk2, NBk3, NBk4, NBk6; combinations thereof, and the like. The invention relates to a multicolor process printing ink set where a 4-color process set which may include a cyan, magenta, yellow and black ink is enhanced with further process colors including any of an orange ink, a violet ink, or a red ink. Yet a further aspect of the invention is that it optionally includes a white ink comprising titanium dioxide.

The pigments are milled to typically less than 1 micrometer after milling with a preferred particle size distribution of 10-500 nm, more preferably 10-350 nm to have better transparency and a wide color gamut. Preferably, the pigments are milled in a bead mill filled with 0.7-0.9 μm ceramic beads. Milling can be performed using a suitable bead milling machine.

The pigments are manufactured and stably stored as a pigment concentrate in water. This is typically achieved by dispersing the pigment into a water-soluble or water-dispersible resin using a water-soluble and/or a water-dispersible surfactant which introduces hydrophilic functional groups into the surface of the pigment particles. Examples of these dispersing resins are numerous and could include polyvinyl alcohols, polyacrylic acid, acrylic acid-acrylonitrile copolymers, vinyl acetate-acrylate copolymers, acrylic acid-acrylate copolymers, styrene-acrylic acid copolymers, styrene-methacrylic acid copolymers, styrene-methacrylic acid-acrylate copolymers, styrene-alpha methyl styrene-acrylic acid copolymers, styrene-alpha methyl styrene-acrylic acid-acrylate copolymers, styrene-maleic acid copolymers, styrene-maleic anhydride copolymers, vinyl naphthalene-acrylic acid copolymers, vinyl naphthalene-maleic acid copolymers, vinyl acetate-maleate copolymers, vinyl acetate-crotonic acid copolymers, and vinyl acetate-acrylic acid copolymers, and the salts thereof. The copolymers can be used in any form of random copolymer, block copolymer, alternating copolymer and graft copolymer. Examples of such resins include Joncryl 67, 678, 8500, 586, 611, 680, 682, 683 and 69 available from BASF. These resins are commonly neutralized with ammonia to enable the preparation of polymer solutions. It is also possible to neutralize such resins with any other organic amine, or indeed an inorganic base.

Examples of surfactants that may optionally be used for the pigment dispersion include, but are not limited to, anionic surfactants such as alkane sulphonates, alpha-olefin sulphonates, alkyl benzene sulphonates, alkyl naphthalene sulphonates, acyl methyl taurinates, dialkyl sulfosuccinates, alkyl sulfates, sulfurized olefins, polyoxyethylene alkyl ether phosphates, polycarboxylic acids and mono glycerol phosphate, amphoteric surfactants such as alkylpyridinium salts and non-ionic surfactants such as polyoxyethylene alkyl ethers, polyoxyethylene alkyl phenyl ethers, polyoxyethylene alkyl esters, polyoxyethylene alkyl amides, glycerol alkyl esters and sorbitan alkyl esters. Examples include EFKA 1000, 4000, 5000 and 6000 series products from BASF, Tamol series products from Dow, and Solsperse 27,000, 40,000, 44,000, 46,000 and 47,000 from Lubrizol.

The printing inks of the invention may further optionally comprise a wax, emulsion or wax dispersion. There are any number of such products available including, but not limited to; carnauba waxes, paraffin waxes, low density polyethylene waxes, high density polyethylene waxes, polypropylene waxes, polyamide waxes, erucamide waxes, PTFE waxes. In a preferred embodiment where a wax is included it should be a biopolymer-based wax, including micronized biopolymer-based waxes. The wax, if present, is in an amount of up to about 4 wt. % of the ink compositions. It is preferred that the wax be present in an amount from about 0.1 wt. % to about 2 wt. % of the ink composition.

The heat resistant inks of the invention may be printed onto any substrate including, but not restricted to; polyester film, polyamide film, aluminum foil, paper and cartonboard. Where the substrate being printed is to be used in ovenable packaging it must be able to resist temperatures of 150° C., or greater, without significant distortion or other loss of mechanical integrity. The invention is advantageously directed to the printing of paper and cartonboard packaging, e.g., folding carton packaging. As the packaging industry seeks approaches to more sustainable technologies then the use of paper and cartonboard packaging, including coated derivatives, will undoubtedly become more important as an alternative to the predominant use of plastic packaging and especially of polyester packaging in this sector. As will be understood in the art, coated derivatives are substrates that have been previously coated with a primer.

As used herein, an ovenable foodstuff is reheated or cooked in an oven at a temperature of from about 150° C. to about 300° C., preferably from about 150° C. to about 250° C. Typically, an ovenable foodstuff is reheated or cooked in an oven for at least 5 minutes.

As well as the printing of food packaging the invention is also suitable for other applications where prints will be exposed to temperatures of 150° C., or more, and where the evolution of any significant amounts of low molecular weight, typically of less than 1000 Daltons, and especially of less than 500 Daltons, could be problematic. Thus, printing inks of the invention may also be used in diverse applications such as dielectric inks and coatings for electronic devices, inks for the printing of automotive components.

As well as the aqueous printing inks described previously, the invention also encompasses the optional application of primers. Primer coatings may be applied to the substrate prior to the printing with the inventive aqueous inks. Primer coatings may be used to enhance the adhesion and print quality of the inventive inks.

Once printed with the inventive inks, the substrates may be further converted by processes including application of adhesives to enable the formation of the finished package, lamination to other plastic, aluminum foil and paper-based substrates, folding and creasing etc. It should be understood that such processes are not an essential feature of the invention only that it is recognized by those skilled in the art that printed matter using the inventive aqueous inks can be further manipulated to produce the final product.

Glass transition temperature (Tg): Unless stated otherwise, glass transition temperature is measured by differential scanning calorimetry (DSC). Preferably, measurements were made according to the following standard test method and based on the method described in ASTM E1356-98. The sample was maintained under an atmosphere of dry nitrogen for the duration of the scan. A flow rate of 20 ml/min and A1 pans were used. Samples (5 mg) were heated at 20° C./min from 20° ° C. to 350° ° C. The value of a Tg was determined as the extrapolated onset temperature of the glass transition observed on the DSC scans (heat flow (W/g) against temperature (C)), as described in ASTM E1356-98.

Softening point: Unless stated otherwise, softening point is measured using a Ring-and-Ball apparatus in accordance with ASTM E28-18.

Viscosity: Unless stated otherwise, viscosity of the ink was measured at 23° C. in deionized water using Zahn 2 cup (i.e., Zahn cup #2).

Particle size/average particle size: In the context of the present invention, the terms "particle size" or "average particle size" refer to the volume distributed median particle diameter (equivalent spherical diameter corresponding to 50% of the volume of all the particles, read on the cumulative distribution curve relating volume % to the diameter of the particles—often referred to as the "D(v,0.5)" value). Particle size may be measured by electron microscope, coulter counter, sedimentation analysis and static or dynamic light scattering. Techniques based on laser light diffraction are preferred.

Acid Value (AV): Acid value (or acid number) is defined as the mass of potassium hydroxide (KOH) in milligrams that is required to neutralize one gram of chemical substance. The acid value is suitably measured in accordance with the ISO 2114:2000(E)(method B) standard.

Hydroxyl value (OHV): Hydroxyl value (or hydroxyl number)_defined as the number of milligrams of potassium hydroxide required to neutralize the acetic acid taken up on acetylation of one gram of a chemical substance that contains free hydroxyl groups. The hydroxyl value is suitably measured in accordance with the ISO 4629-1:2016(E) standard.

The present invention has been described in detail, including the preferred embodiments thereof. However, it will be appreciated that those skilled in the art, upon consideration of the present disclosure, may make modifications and/or improvements on this invention that fall within the scope and spirit of the invention.

The invention is further described by the following numbered paragraphs:

1. An aqueous printing ink composition comprising water, polyester resin and optionally one or more colorants, wherein the printed composition meets EUPIA food contact guidelines when subjected to elevated temperature ≥100° C.

2. The composition of paragraph 1, wherein the printed composition meets EUPIA food contact guidelines when subjected to elevated temperature ≥150° C.

3. The composition of paragraph 1, wherein the printed composition meets EUPIA food contact guidelines when subjected to elevated temperature ≥200° C.

4. The composition of paragraph 1, wherein the printed composition meets EUPIA food contact guidelines when subjected to elevated temperature ≥220° C.

5. The composition of any preceding paragraph further comprising one or more waxes.

6. The composition of paragraph 5, wherein the wax is derived from biobased waxes.

7. The composition of any preceding paragraph, wherein the composition is suitable for inkjet printing, rotogravure printing, offset printing and screen printing, flexographic printing and inkjet printing.

8. The composition of any preceding paragraph, wherein the composition is suitable for flexographic or inkjet printing.

9. The composition of any preceding paragraph, wherein the polyester resin is selected from the group consisting of an aqueous polyester dispersion, a solution of a sulfopolyester, a rosin-derived polyester or blends thereof.

10. The composition of any preceding paragraph, wherein the polyester is a renewable polyester.

11. The composition of any preceding paragraph, wherein the polyester resin has a glass transition temperature of ≤80° C.

12. The composition of any preceding paragraph, wherein the colorant is selected from the group consisting of Paliotol Yellow D1818, Irgazin Orange D2905, Irgazin Rubine L4025, Heliogen Blue D6840, Cromophtal Violet D5700, Suncroma C47-2222, Isoindoline yellow, diketopyrrolo-pyrolle orange, diketopyrrolo-pyrolle red, quinacridone red, phthalocyanine blue, dioxazin violet, carbon black, titanium dioxide, and blends thereof.

13. The composition of any preceding paragraph, wherein the colorants used to prepare the inks are selected from the group consisting of pigment yellow 138, pigment orange 71, pigment red 264, pigment blue 15:0, pigment violet 37, pigment red 122 or blends thereof.

14. The composition of any preceding paragraph, further comprising a crosslinker.

15. The composition of paragraph 14, wherein the crosslinker is a carbodiimide.

16. A printing ink set comprising cyan, magenta, yellow and black inks along with at least one further ink selected from orange, green or violet and which may further optionally comprise a white ink, wherein the inks are based on the composition of any one or more of paragraphs 1-15.

17. A method of providing a printed article, comprising applying the inks of any one or more of paragraphs 1-16 onto a substrate and drying the inks.

18. The method of paragraph 17, wherein the inks are not overprinted with an overprint varnish.

19. The method of paragraph 17 or 18, wherein the printed article is a food packaging article.

20. The method of any one or more of paragraphs 17-19, wherein the printed article is paper based.

21. The method of any one or more of paragraphs 17-19, wherein the printed article is compliant with EUPIA food packaging regulations when subjected to elevated temperature ≥100° C.

22. The method of any one or more of paragraphs 17-19, wherein the printed article is compliant with EUPIA food packaging regulations when subjected to elevated temperature ≥150° C.

23. The method of any one or more of paragraphs 17-19, wherein the printed article is compliant with EUPIA food packaging regulations when subjected to elevated temperature ≥200° ° C.

24. The method of any one or more of paragraphs 17-19, wherein the printed article is compliant with EUPIA food packaging regulations when subjected to elevated temperature ≥220° C.

25. A printed article resulting from the method of any one or more of paragraphs 17-23.

26. The article of paragraph 25, wherein the article is a paper-based food packaging article.

The present invention has been described in detail, including the preferred embodiments thereof. However, it will be appreciated that those skilled in the art, upon consideration of the present disclosure, may make modifications and/or improvements on this invention that fall within the scope and spirit of the invention.

EXAMPLES

The invention is further described by the following non-limiting examples which further illustrate the invention, and are not intended, nor should they be interpreted to, limit the scope of the invention.

For the preparation of water-based flexo ink examples according to the invention, the following varnish was prepared to enable both pigment dispersions and the ink examples to be prepared.

TABLE 1

| Example A Ovenable Technical varnish (Ovenable TV) | |
| --- | --- |
| Raw Material | % |
| Water | 52.6 |
| Polyester Resin 1[1] | 37.7 |
| Aqueous Ammonia solution (32% v/v) | 9.7 |
| Total | 100.00 |

[1]A solid polyester resin having an acid value of 125 mg KOH/g

TABLE 2

| Example B Ovenable Technical varnish (Ovenable TV) | |
| --- | --- |
| Raw Material | % |
| Water | 52.6 |
| Polyester Resin 2[2] | 37.7 |
| Ammonia solution (32% v/v) | 9.7 |
| Total | 100.00 |

[2]An aqueous sulfopolyester dispersion containing 33 wt % solids.

TABLE 3

| Example C Ovenable Technical varnish (Ovenable TV) | |
| --- | --- |
| Raw Material | % |
| Water | 52.6 |
| Polyester Resin 3[3] | 37.7 |
| Ammonia solution (32% v/v) | 9.7 |
| Total | 100.00 |

[3]An aqueous sulfopolyester dispersion containing 2 wt % n-propanol and 30 wt % solids.

The formulations for the pigment concentrates are shown in Table 4 and the final ink compositions are shown in Table 5.

TABLE 4

| Preparation of Pigment Concentrates using the Technical Varnish | | | | | | | | |
| --- | --- | --- | --- | --- | --- | --- | --- | --- |
| Ovenable Base conc. | Ex. A Ovenable TV | Pigment Yellow 138 | Pigment Orange 71 | Pigment Red 264 | Pigment Blue 15:0 | Pigment Violet 37 | Pigment Magenta 122 | Pigment Black 7 |
| Ovenable Yellow (OY) | 86 | 14 | | | | | | |
| Ovenable Orange (OO) | 86.5 | | 13.5 | | | | | |
| Ovenable Red (OR) | 80 | | | 20 | | | | |
| Ovenable Blue (OB) | 80 | | | | 20 | | | |
| Ovenable Violet (OV) | 80.5 | | | | | 19.5 | | |
| Ovenable Magenta (OM) | 80 | | | | | | 20 | |
| Ovenable Black (OK)[1] | 69.1 | | | | | | | 17.3 |

Notes to Table 4:
[1]The black concentrate also contains 13.6% of deionized water.

The pigment concentrates were prepared by first premixing the pigment into the ovenable varnish using a Dispermat high shear stirrer. The premixes were then fully dispersed by passing them through a bead mill filled with 0.7-0.9 μm ceramic beads.

The inventive ink examples were prepared by blending, with a Dispermat high shear stirrer, the pigment concentrates with more of the ovenable varnish and a biobased wax.

TABLE 5

| Inventive Ovenable Aqueous Flexo Inks | | | |
| --- | --- | --- | --- |
| Inventive Example | Ex. A Ovenable TV | Pigment Dispersion | Biobased Wax |
| 1 | 50 | 48 OY | 2 |
| 2 | 50 | 48 OO | 2 |
| 3 | 50 | 48 OR | 2 |
| 4 | 50 | 48 OB | 2 |
| 5 | 50 | 48 OV | 2 |
| 6 | 50 | 48 OM | 2 |
| 7 | 50 | 48 OK | 2 |

TABLE 5-continued

| Inventive Ovenable Aqueous Flexo Inks | | | |
| --- | --- | --- | --- |
| Inventive Example | Ex. A Ovenable TV | Pigment Dispersion | Biobased Wax |

As a further example, an ovenable over-lacquer, Example 8, was prepared by blending 98% of the ovenable technical varnish with 2% of the biobased wax.

All the inks were reduced in viscosity using deionized water, to 25 sec. Zahn 2 cup.

For comparison, a commercial aqueous flexo ink comprising a blend of acrylic emulsions, but comprising an ink set based on PY13, PO34, PR266, PV37, PB15:0, Pigment Black 7 was also tested.

The inks were printed onto MGBK paper (Machine Glazed Bleached Kraft paper) or polyester film using a 9.5 cc/m² anilox. MGBK is a typical paper board used for various food packaging applications.

The resultant prints were tested for brightness, immersion properties, bleed, and rub resistance. The results are shown in the tables below. The inventive inks were compared to Aquaprop inks (commercially available acrylic food packaging inks, available from Sun Chemical). It should be noted that the inventive inks give either similar or better properties when compared to the comparative inks, which typically require an overprint varnish.

To show fitness for use, the inks of the present invention were subjected to immersion, bleed and rub tests and compared to the comparative Aquaprop inks.

Prints were submerged in the liquid reagents, then removed after 1 hour and assessed by pat drying to determine if there's any removal of print. Results are shown in Table 6.

TABLE 6

| Immersion Tests: 1-hour immersion in various reagents | | | | | | | | |
| --- | --- | --- | --- | --- | --- | --- | --- | --- |
| | Example | | | | | | | Aquaprop |
| Immersion Fluid | 1 | 2 | 3 | 4 | 5 | 6 | 7 | Ink |
| Water | 5 | 5 | 5 | 5 | 5 | 5 | 5 | 5 |
| Acetic acid | 5 | 5 | 5 | 5 | 5 | 5 | 5 | 5 |
| Saline | 5 | 5 | 5 | 5 | 5 | 5 | 5 | 5 |
| Olive Oil | 5 | 5 | 5 | 5 | 5 | 5 | 5 | 5 |

Scale: 5 = No removal;
4 = slight removal;
3 = moderate removal;

TABLE 6-continued

| Immersion Tests: 1-hour immersion in various reagents | | | | | | | | |
| --- | --- | --- | --- | --- | --- | --- | --- | --- |
| | Example | | | | | | | Aquaprop |
| Immersion Fluid | 1 | 2 | 3 | 4 | 5 | 6 | 7 | Ink |

2 = severe removal;
1 = total removal

Table 6 shows that the immersion resistance properties of the inventive inks are as good as the Aquaprop commercial inks.

Prints were placed onto pieces of filter paper on top of glass squares and soaked in the various liquid reagents. Another filter paper was placed on top with a glass square blocking the sandwich and a 1 kg weight to provide pressure. After 18 hours, the construct was disassembled, and the print patted dry. Any removal of ink was recorded using the same rating scale as above.

TABLE 7

| Bleed Tests | | | | | | | | |
| --- | --- | --- | --- | --- | --- | --- | --- | --- |
| | Example | | | | | | | Aquaprop |
| Soaking Fluid | 1 | 2 | 3 | 4 | 5 | 6 | 7 | Ink |
| Water | 5 | 5 | 5 | 5 | 5 | 5 | 5 | 5 |
| Acetic acid | 5 | 5 | 5 | 5 | 5 | 5 | 5 | 5 |
| Saline | 5 | 5 | 5 | 5 | 5 | 5 | 5 | 5 |
| Olive Oil | 5 | 5 | 5 | 5 | 5 | 5 | 5 | 5 |

Table 7 shows that the Inventive inks performed similarly to the comparative inks for bleed resistance.

TABLE 8

| Rub Tests | | | | | | | | |
| --- | --- | --- | --- | --- | --- | --- | --- | --- |
| | Test | | | | | | | Aquaprop |
| | 1 | 2 | 3 | 4 | 5 | 6 | 7 | Ink |
| Dry PIRA | 5 | 5 | 5 | 5 | 5 | 5 | 5 | 5 |
| Wet SATRA | 5 | 5 | 5 | 5 | 5 | 5 | 5 | 5 |
| Wet finger | 5 | 5 | 5 | 5 | 5 | 5 | 5 | 5 |

The rub resistance of prints was assessed by using a SATRA circular rub tester, equipped with fabric pads. The dry rub resistance was determined after 100 revolutions under a 2 psi load. The wet rub resistance was assessed using a PIRA tester after 10 revolutions with the fabric pad soaked in water, with no added pressure. As a further test the prints were soaked in water for 1 hour and then rubbed 10 times with a finger to assess any print removal. Rating scale is the same as above.

In Table 8 the Inventive inks performed similarly to the Aquaprop ink.

Migration Testing

Prints (on PET film) were placed in migration cells in contact with Tenax simulant for 2 hours at 220° C. Tenax is a polymer (poly(2,6-diphenylphenylene oxide) used as a dry food simulant in migration testing and its use is well known to those skilled in the art. Using Tenax in these tests allowed the migration of components from the prints to be assessed at elevated temperatures. Cell 'blanks', based on Tenax in contact with virgin aluminum foil, were used to ensure that no contaminants were introduced during cell construction or sample workup. After the 2 hours the cells were emptied and the Tenax extracted into 40 ml of acetonitrile. The acetonitrile was then evaporated to 1 ml using an automatic evaporator and the resulting concentrate analyzed by GC-MS. Though migration testing was performed at 220° C., it is well known the inks performing well at 220° C. would also perform well at lower temperatures, for example $\leq 220°$ C., $\leq 210°$ C., $\leq 200°$ C., $\leq 190°$ C., $\leq 180°$ C., $\leq 170°$ C., $\leq 160$, $\leq 150°$ C., $\leq 140°$ C., $\leq 130°$ C., $\leq 120°$ C., $\leq 110°$ C., $\leq 100°$ C., or any other temperature $\leq 220°$ C., including room temperature.

The following Tables show how the inks of the present invention produce significantly lower levels of migratable species vs. the commercial ink (Aquaprop). This is undoubtedly due to their enhanced thermal resistance as the commercial inks, under normal packaging use, without any heat treatment, produce low levels of migratable species under ambient conditions.

The results are reported as the amount of migratable species that would contaminate food, according to the standard EU Model Package, where 1 Kg of food is contained within 6 dm² of packaging. The assumption is that the entire package is printed with the inventive and comparative inks.

Migration Data

TABLE 9

| Inventive Inks: Migration data on Polyester (220° C. for 2 hr.) | | |
| --- | --- | --- |
| | Inventive Inks | |
| Example | Migratable Species 1 (Phthalimide)(ppb) | Migratable Species 2 (2,4-Dichloro-N-methylbenzamide) (ppb) |
| 8 (Varnish) | ND | 27 |
| 1 (Yellow) | ND | 25 |
| 2 (Orange) | ND | ND |
| 3 (Red) | ND | ND |
| 4 (Blue) | 17 | 52 |
| 5 (Violet) | ND | 47 |
| 6 (Magenta) | ND | 41 |
| 7 (Black) | ND | ND |

ND = not detected

TABLE 10

| Aquaprop Inks: Migration data on Polyester (220° C. for 2 hr.) | | |
| --- | --- | --- |
| | Comparative Inks | |
| Example | Migratable Species 3 (Pentatriacotane) (ppb) | Migratable Species 4 (Methyl 2, 5, 8, 11, 14, 17, 20, 23, 26, 29, 32 undecaoxatetratria-contan-34-oate) (ppb) |
| Yellow | 94 | 100 |
| Orange | 82 | 178 |
| Red | 56 | 105 |
| Blue | 62 | 145 |
| Violet | 47 | 127 |
| Magenta | 52 | 153 |
| Black | 53 | 156 |

The results in Tables 9 and 10 show that the inventive inks comprising the aqueous polyester resin produce significantly lower migratable species when the prints are heated at 220° C. for 2 hours and then subjected to the migration testing as previously described. This is clearly due to the careful choice of the binder resin (and pigments) used in the preparation of the inventive inks.

The invention claimed is:

1. A method of providing an ovenable packaged food product comprising printing a substrate with an aqueous printing ink composition, drying said ink composition to provide a printed substrate and packaging a foodstuff with said printed substrate, wherein the method excludes printing or applying any layers over the dried ink composition, wherein the ink composition comprises one or more colorants, water and polyester resin, wherein the one or more colorants is selected from the group consisting of Paliotol Yellow D1818, Irgazin Orange D2905, Irgazin Rubine L4025, Heliogen Blue D6840, Cromophtal Violet D5700, Suncroma C47-2222, Isoindoline yellow, diketopyrrolo-pyrrole orange, diketopyrrolo-pyrrole red, quinacridone red, phthalocyanine blue, dioxazin violet, carbon black, titanium dioxide, Pigment Yellow 138, Pigment Orange 71, Pigment Red 264, Pigment Blue 15:0, Pigment Violet 37, Pigment Magenta 122, Pigment Black 7 and blends thereof, wherein the polyester resin is a renewable polyester or selected from the group consisting of an aqueous polyester dispersion, a solution of a sulfopolyester, a rosin-derived polyester and blends thereof, wherein the ink composition does not contain any self-crosslinking acrylics, and wherein the printed substrate has less than 50 ppb migratable species when heated to 220° C.

2. The method of claim 1, wherein the substrate is paper or cartonboard.

3. The method of claim 1, wherein the aqueous ink composition is applied by inkjet printing, rotogravure printing, offset printing, screen printing or flexographic printing.

4. The method of claim 1, wherein the foodstuff is ovenable.

5. The method of claim 1, wherein the polyester resin has an acid value from about 50 to about 250 mgKOH/g.

6. The method of claim 1, wherein the ink composition comprises from about 12 to about 50 wt % polyester resin.

7. The method of claim 1, wherein the polyester resin has a glass transition temperature of ≤80° C.

8. The method of claim 1, wherein the polyester resin is a sulfopolyester resin with a glass transition temperature of ≤80° C.

9. The method of claim 1, wherein the printed substrate with an aqueous ink composition is compliant with EUPIA food packaging regulations.

10. An ovenable packaged food product resulting from the method of claim 1.

11. The packaged food product according to claim 10, wherein the packaged food product excludes any additional ink layer, varnish layer or plastic layer over the printed ink.

12. An ovenable packaged food product comprising a food stuff and a printed substrate, wherein the printed substrate comprises an ink layer derived from an aqueous printing ink composition comprising one or more colorants, water and polyester resin, wherein the one or more colorants is selected from the group consisting of Paliotol Yellow D1818, Irgazin Orange D2905, Irgazin Rubine L4025, Heliogen Blue D6840, Cromophtal Violet D5700, Suncroma C47-2222, Isoindoline yellow, diketopyrrolo-pyrrole orange, diketopyrrolo-pyrrole red, quinacridone red, phthalocyanine blue, dioxazin violet, carbon black, titanium dioxide, Pigment Yellow 138, Pigment Orange 71, Pigment Red 264, Pigment Blue 15:0, Pigment Violet 37, Pigment Magenta 122, Pigment Black 7 and blends thereof, wherein the polyester resin is a renewable polyester or selected from the group consisting of an aqueous polyester dispersion, a solution of a sulfopolyester, a rosin-derived polyester and blends thereof, wherein the ink composition does not contain any self-crosslinking acrylics, and wherein the packaged food product excludes any additional ink layer, varnish layer or plastic layer over the printed ink and wherein the printed substrate has less than 50 ppb migratable species when heated to 220° C.

13. The packaged food product according to claim 10, wherein the food stuff is ovenable.

14. The packaged food product according to claim 10, wherein the printed substrate is printed paper or cartonboard.

15. A method of providing an ovenable packaged food product comprising printing a substrate with an aqueous printing ink composition, drying said ink composition to provide a printed substrate and packaging a foodstuff with said printed substrate, wherein the method excludes printing or applying any layers over the dried ink composition, wherein the ink composition comprises one or more colorants, water and polyester resin, wherein the one or more colorants is selected from the group consisting of Paliotol Yellow D1818, Irgazin Orange D2905, Irgazin Rubine L4025, Heliogen Blue D6840, Cromophtal Violet D5700, Suncroma C47-2222, Isoindoline yellow, diketopyrrolo-pyrrole orange, diketopyrrolo-pyrrole red, quinacridone red, phthalocyanine blue, dioxazin violet, carbon black, titanium dioxide, Pigment Yellow 138, Pigment Orange 71, Pigment Red 264, Pigment Blue 15:0, Pigment Violet 37, Pigment Magenta 122, Pigment Black 7 and blends thereof, wherein the polyester resin is a renewable polyester selected from the group consisting of an aqueous polyester dispersion, a solution of a sulfopolyester, a rosin-derived polyester and blends thereof, wherein the ink composition does not contain any self-crosslinking acrylics, and wherein the printed substrate has less than 50 ppb migratable species when heated to 220° C.

* * * * *